US006932060B2

United States Patent
Lee

(10) Patent No.: US 6,932,060 B2
(45) Date of Patent: Aug. 23, 2005

(54) STARTING METHOD OF AN LPI ENGINE IN PARTIAL COOL-DOWN STATE

(75) Inventor: Woo-Jik Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,250

(22) Filed: Dec. 30, 2003

(65) Prior Publication Data

US 2005/0087176 A1 Apr. 28, 2005

(30) Foreign Application Priority Data

Oct. 22, 2003 (KR) .............................. 10-2003-0073903

(51) Int. Cl.⁷ ............................................ F02D 41/00

(52) U.S. Cl. ................... 123/491; 123/179.17; 123/527

(58) Field of Search ...................... 123/179.16, 179.17, 123/478, 491, 527

(56) References Cited

U.S. PATENT DOCUMENTS

| | | | | |
|---|---|---|---|---|
| 6,766,269 B2 | * | 7/2004 | Lee | ............................. 123/527 |
| 6,786,201 B2 | * | 9/2004 | Ohtani | ....................... 123/491 |
| 2003/0230289 A1 | * | 12/2003 | Yamaoka et al. | ........... 123/527 |

FOREIGN PATENT DOCUMENTS

JP          11036990          2/1999

* cited by examiner

Primary Examiner—Tony M. Argenbright
(74) Attorney, Agent, or Firm—Morgan Lewis & Bockius LLP

(57) ABSTRACT

A starting method of an LPI engine in a partial cool-down state wherein an engine is allowed to start with ample fuel pressure obtained in a fuel line when an LPI engine is in a partial cool-down state, thereby enabling the engine to start smoothly, and a fuel pump is driven at a maximum speed for a prescribed period of time within the scope of not generating noise even after starting of the engine has been performed, thereby enabling a stable engine operation.

3 Claims, 2 Drawing Sheets

STARTING METHOD OF AN LPI ENGINE IN PARTIAL COOL-DOWN STATE

CROSS-REFERENCE TO RELATED APPLICATIONS

This application claims priority to Korean Application No. 10-2003-0073903, filed on Oct. 22, 2003, the disclosure of which is incorporated fully herein by reference.

FIELD OF THE INVENTION

The present invention relates to a re-starting method of an LPI (Liquefied Petroleum Injection) engine after the LPI engine has been turned off and operated under normal temperature conditions and approximately 20–30 minutes has lapsed in a PCD (Partial Cool-Down) state and, more particularly, to a method of improving the starting capability of an LPI engine in a PCD state.

BACKGROUND OF THE INVENTION

Unlike the conventional LPG (Liquefied Petroleum Gas) engine, an LPI engine is mounted with a pump in a bombe for transferring Liquefied Petroleum (LP) gas via a fuel line and to allow the LP gas to be ejected from an injector. LP gas abruptly increases a saturated steam pressure (the increase described by a parabola) when heated, to cause a temperature thereof to increase. When the temperature in the engine room rises, pressure in the fuel line increases. When an engine operates under normal temperature conditions (under a fully heated state, not a warm-up state), and is stopped thereafter, fuel in a fuel line receives radiant heat from the engine that causes pressure in the fuel line to rise. The operating pressure in a pressure regulator becomes abnormal, causing the fuel to pass through the pressure regulator and to return to a bombe, resulting in a state of liquefied fuel and gasified (vaporized) fuel being mixed and co-existing.

The mixed state of the fuel is worse under a partial cool-down state where an engine has been turned off for 20–30 minutes, which causes the temperature in the engine room to remain high. When LP is changed from a liquefied state to a gasified state, the volume of the fuel increases approximately 250 times, so even if a small portion of gasified fuel is injected, the fuel-air mixture becomes very thin and causes problems in the smooth starting of an engine.

SUMMARY OF THE INVENTION

The present invention provides a starting method of an LPI engine in a partial cool-down state. The present invention allows an engine to start with ample fuel pressure in a fuel line when the engine is in a partial cool-down state, thus enabling the engine to start smoothly.

The present invention is a starting method for an LPI engine in a partial cool-down state comprising the steps of: determining that the engine is in a partial cool-down state; disallowing fuel to be injected into the engine for a first predetermined amount of time; further disallowing fuel to be injected into the engine for at most a second predetermined amount of time if the fuel pressure in the fuel line has not reached a target fuel pressure; and injecting fuel into the engine to complete the starting of the engine when the target fuel pressure has been reached or the second predetermined amount of time has elapsed, whichever is earlier.

BRIEF DESCRIPTION OF THE DRAWING

For a better understanding of the nature and objects of the present invention, reference should be made to the following detailed description with the accompanying drawing, in which.

DETAILED DESCRIPTION OF THE PREFERRED EMBODIMENT

Figure 1A:
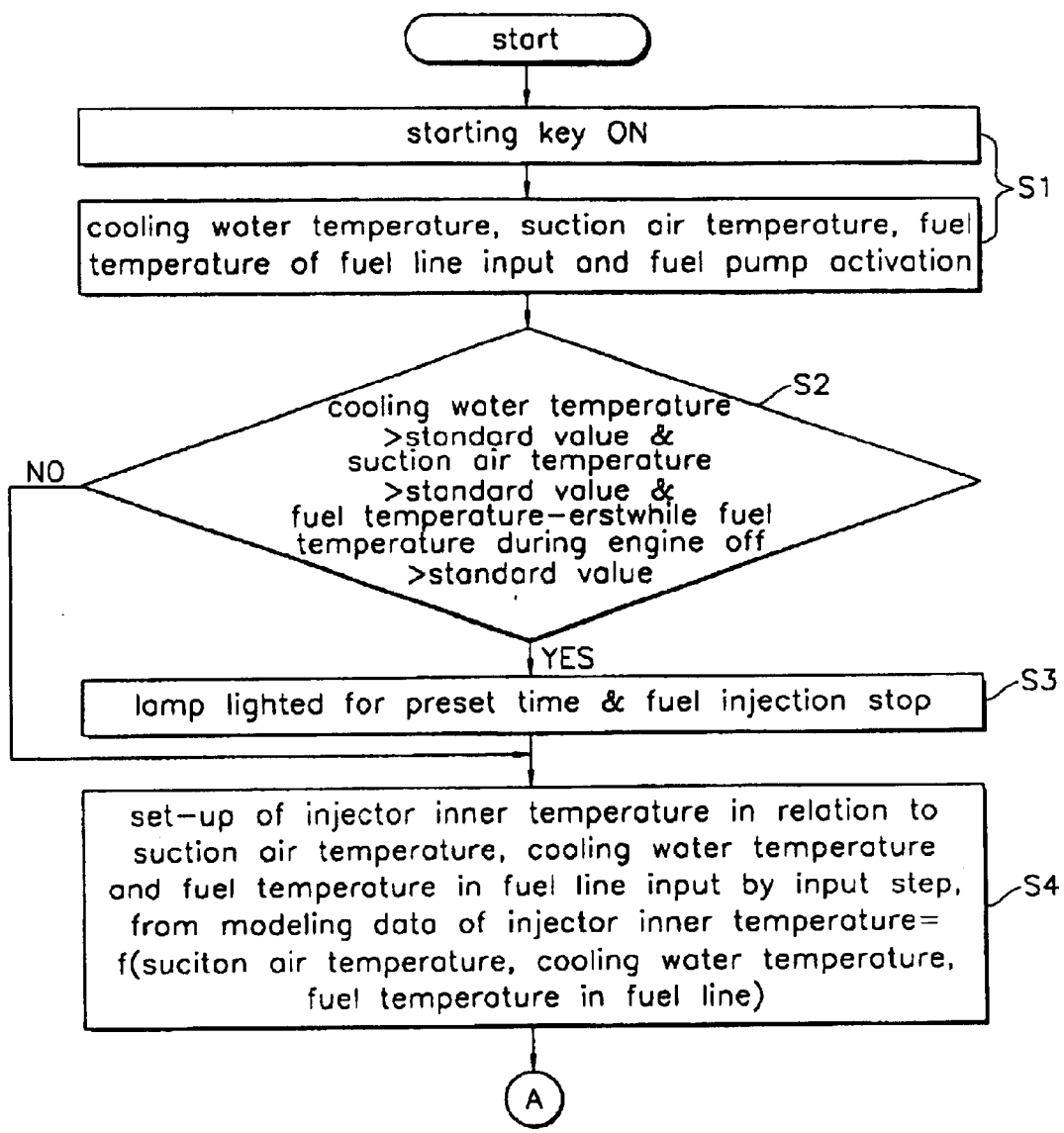
FIGS. 1A and 1B are a flow chart for explaining a starting method of an LPI engine in a partial cool-down state according to an embodiment of the present invention.
Figure 1B:
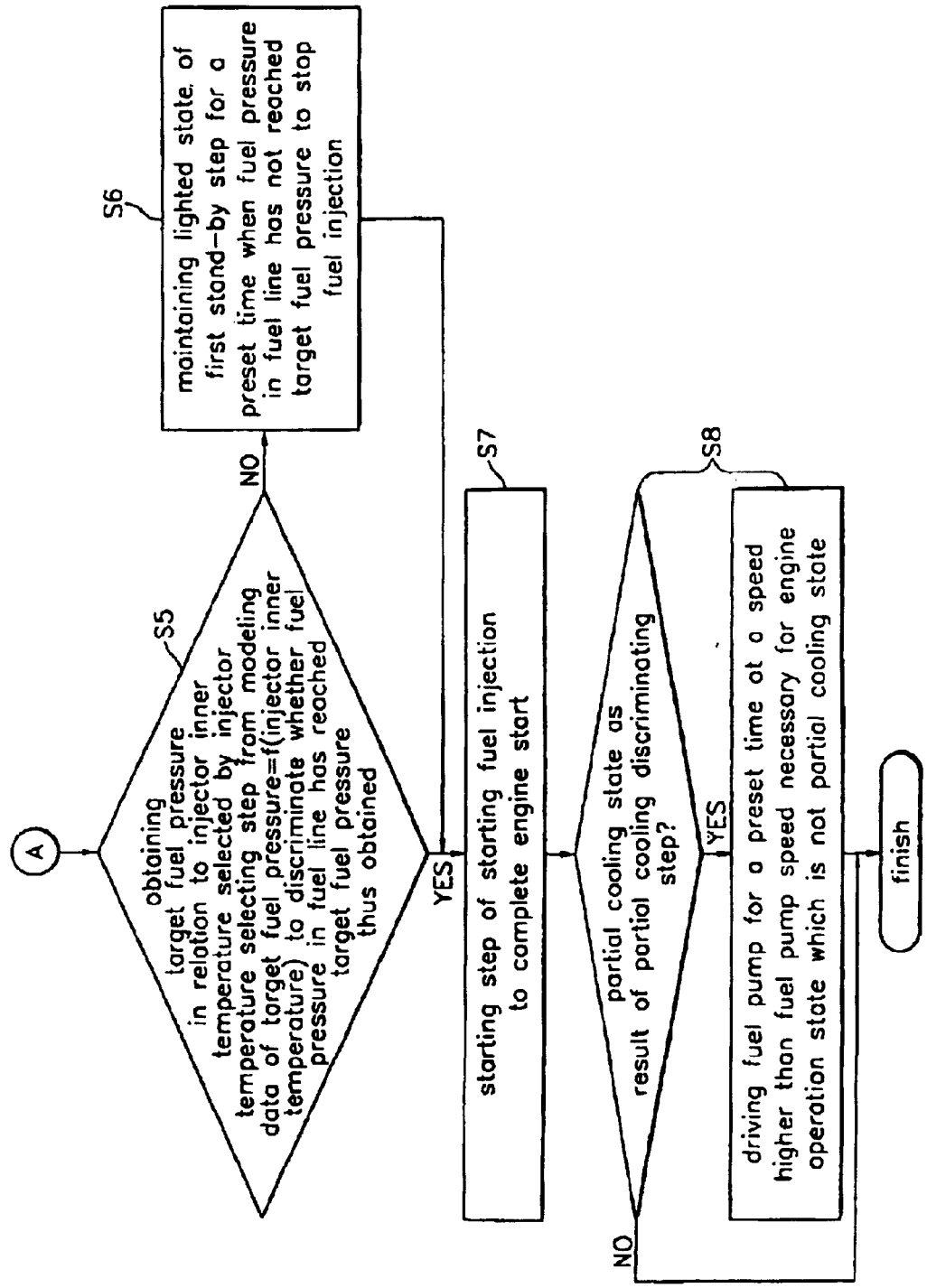

The preferred embodiment of the present invention will now be described in detail with reference to the annexed drawings. The present embodiment does not limit the scope of the present invention but is given only as an illustrative purpose.

As shown in the figures when the ignition is turned on via an ignition key, a cooling water temperature, suction air temperature, and fuel temperature in a fuel line are received from sensors for operating a fuel pump (S1) (hereinafter, S defines a step).

When the input cooling water temperature and the suction air temperature are both above standard levels, and the difference between the fuel temperature in the fuel line and the fuel temperature of the engine when the engine is off is above a standard level, it is determined that the engine is in a partial cool-down state (S2). The engine room temperature rises and radiant heat of the engine acts on the fuel line under the partial cool-down state so that the fuel temperature of the fuel line becomes higher than that of the fuel in the engine when the engine is off. Whether a difference among these fuel temperatures is above a standard level (e.g., 10° C.) is an important factor in the determination of the partial cool-down state of an LPI engine. Furthermore, the cooling water temperature of an engine and suction air temperature are important physical property values, and whether these temperatures are respectively above standard levels (e.g., cooling water temperature of 60° C. and suction air temperature of 40° C.) is also a factor for determining whether an engine is under a partial cool-down state, such that these two factors should be taken into account in determining whether an LPI engine is in a partial cool-down state that causes a starting problem.

When the engine is in a partial cool-down state, a lamp is lighted to notify a driver that an engine is in a partial cool-down state to stop the fuel injection and stop the operation of the engine (S3, the first stand-by step). As it is very difficult to start an engine smoothly when the engine is in a partial cool-down state, the step of S3 basically prevents the starting of the engine, and the prescribed time given here is approximately 2 seconds.

As a result of the determination that the engine is in a partial cool-down state at step S2, or if the engine is not in a partial cool-down state, or the first stand-by step at S3 is completed, an injector temperature selecting step (S4) is performed where an injector inner temperature is selected in relation to the suction air temperature, the cooling water temperature, and the fuel temperature in the fuel line. The selection my also be based upon a three dimensional (3-D) data stored in a memory. The reason for carrying out the injector temperature selecting step is that the injector inner temperature increases by approximately 12–16° C. compared with the fuel temperature in the fuel line in the partial cool-down state of an engine, such that even if the vaporized state is removed from the fuel of the fuel line, the vaporized fuel still remains in the injector and deteriorates the starting when the fuel is injected. The fuel pressure in the fuel line should be removed as much as possible to eliminate the vaporized fuel in the inner injector, thus enabling a smooth starting of the engine with a proper liquefied fuel injection.

Next, a target fuel pressure in relation to the injector inner temperature selected from the injector temperature selecting step is obtained, and a target fuel pressure determining step (S5) is carried out to determine whether the fuel pressure in the fuel line has reached the target fuel pressure thus obtained. In other words, a target fuel pressure in relation to the injector inner temperature thus selected is sought out (not the target fuel pressure in relation to the fuel temperature of the fuel line), and determination is made as to whether a fuel pressure of the fuel line increased by the driving of the fuel pump has reached a target fuel pressure obtained from target fuel pressure modeling data in relation to the injector inner temperature determined by previous experimentation, thereby determining whether fuel has been injected.

The data modeled after the target fuel pressure in relation to the injector inner temperature is made on the basis of a saturated vapor pressure line drawing of fuel, and it is intended to obtain a target fuel pressure where fuel is not vaporized under the currently selected injector inner temperature. When the fuel temperature of the fuel line, not the injector inner temperature, is considered and determined while the target fuel pressure is obtained, fuel can be vaporized in the injector by the injector inner temperature having a higher temperature, the phenomenon of which must be prevented.

As a result of step S5, the lighted state of the lamp in the first stand-by step (S3) is maintained for a prescribed period of time to carry out the second stand-by step (S6) where the fuel is not injected if the fuel pressure of the fuel line has not reached the target fuel pressure. Preferably, the aforementioned prescribed time should not surpass 2.5–3.0 seconds in consideration of the marketability of a vehicle, including the prescribed time in the first stand-by step (S3). Subsequently, the lamp is lighted up and the fuel injection is stopped to a maximum of approximately 0.5–1.0 second at the second stand-by step (S6).

As a result of S5, if the target fuel pressure is reached or the second stand-by step (6) is completed, S7 (engine starting step) is carried out where fuel injection is activated to start the engine, thereby enabling a smooth engine operation with an appropriate injection of liquefied fuel to a combustion chamber.

There might be a case, however, where air bubbles are generated in the fuel by the high temperature of the injector even after the engine has been started as mentioned above, disabling a smooth operation of an engine. In another preferred embodiment of the present invention, a fuel pump is run at a high speed for a predetermined period of time to prevent the said phenomenon. In other words, as a result of S2, if the engine is in a partial cool-down state, a fuel pump speed accelerated step (S8) is performed where a fuel pump is operated for a prescribed time at a higher speed than that of a fuel pump necessary for a usual engine operation state, not for a partial cool-down state, after the starting step of S7.

The said fuel pump speed is the maximum speed a fuel pump can manage without generating a noise, and can be varied according to each fuel pump model. The necessary fuel pump driving time at a high speed is a minimum time where the fuel temperature inside the injector becomes the same as the fuel temperature in the fuel line, which is approximately 15 to 30 seconds. Subsequently, even after the engine is smoothly started, the fuel pump is run at a high speed to maintain a sufficient fuel pressure within the fuel line and to obtain a stable engine operating state.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

As apparent from the foregoing, there is an advantage in the starting method of an LPI engine in a partial cool-down state thus described according to the embodiment of the present invention in that an engine is allowed to start with ample fuel pressure obtained in a fuel line when an LPI engine is in a partial cool-down state, thereby enabling the engine to start smoothly, and a fuel pump is driven at a maximum speed for a prescribed period of time within the scope of not generating noise even after starting the engine, thereby enabling stable engine operation.

What is claimed is:

1. A method for starting an LPI engine in a partial cool-down state comprising the steps of:

receiving a cooling water temperature, a suction air temperature, and a fuel temperature in a fuel line to operate a fuel pump when an ignition key is turned on;

determining that the engine is in a partial cool-down state when the cooling water temperature and the suction air temperature are above a standard levels, and the difference between the said fuel temperature and a fuel temperature of the engine when the engine is turned off is above a standard level;

lighting a lamp for a first predetermined period of time when it is determined that the engine is in a partial cool-down state, such that fuel is not injected into the engine during the first predetermined period of time;

selecting an injector inner temperature based upon the suction air temperature, the cooling water temperature and the fuel temperature in the fuel line;

seeking a target fuel pressure based upon the injector inner temperature to discriminate whether the fuel pressure in the fuel line has reached the target fuel pressure thus obtained;

maintaining a lighted state of the lamp at the first stand-by stage when the fuel pressure in the fuel line has not reached the target fuel pressure, such that fuel is not injected into the engine; and injecting fuel into the engine to complete the starting of the engine when the fuel pressure has reached the target fuel pressure or when the second predetermined period of time has elapsed, whichever is earlier.

2. The method as defined in claim 1 further comprising a step of driving the fuel pump at a higher speed than that of a fuel pump necessary for usual engine operation, not for the partial cool-down state, after the engine starting step if the engine was determined to be in a partial cool-down state.

3. A method for starting an LPI engine in a partial cool-down state comprising:

determining whether the engine is in a partial cool-down state;

if the engine is in a partial cool-down state, then disallowing fuel to be injected for a first determined period of time;

determining an injector inner temperature;

determining a target fuel pressure;

identifying a second predetermined period of time;

injecting fuel into the engine only when the fuel pressure reaches the target fuel pressure or the second predetermined period of time has elapsed, whichever is earlier.

* * * * *